Feb. 27, 1923.

J. DIERKS

POULTRY FEEDER

Filed Apr. 18, 1921

INVENTOR.
JOHN DIERKS
BY A. B. Bowman
ATTORNEYS.

Patented Feb. 27, 1923.

1,446,694

UNITED STATES PATENT OFFICE.

JOHN DIERKS, OF KANSAS CITY, KANSAS.

POULTRY FEEDER.

Application filed April 18, 1921. Serial No. 462,294.

*To all whom it may concern:*

Be it known that I, JOHN DIERKS, a citizen of the United States, residing at Kansas City, in the county of Wyandotte and State of Kansas, have invented a certain new and useful Poultry Feeder, of which the following is a specification.

My invention relates to a poultry feeder, more particularly a feeding device to be used in poultry yards for automatically feeding grain or dry food to poultry, and the objects of my invention are, First; to provide a feeder of this class which may be pivotally supported upon any perpendicular object such as the side of a building or posts and adapted to swing thereon and with resilient bumpers to cause it to swing when started thus causing the food to pass downwardly in a position so that the poultry can get at it, Second, to provide a novelly constructed bottom or food mover for poultry feeders, Third, to provide a poultry feeder of this class which will not only automatically feed the poultry but will give them exercise as well, and, Fourth, to provide a poultry feeder of this class which is very simple and economical of construction, durable, easy to operate, easy to install and which will not readily deteriorate or get out of order.

With these and other objects in view as will appear hereinafter my invention consists of certain novel features of construction, combination and arrangement of parts and portions as will be hereinafter described in detail and particularly set forth in the appended claims, reference being had to the accompanying, drawings and to the characters of reference thereon which form a part of this application in which,—

Figure 1, is a top view of my feeder with the cover removed.

Figure 2, a transverse sectional view through 2—2 of Fig. 3, and Fig. 3, a front elevational view of said feeder.

Similar characters of reference refer to similar parts and portions throughout the several views of the drawings.

The end members 1, bottom 2, feed trough 3, supporting cleats 4, hinges 5, perch sills 6, perch 7, roof 8, back side 9, front side 10, springs 11 and chain 12 and perpendicular support 13, constitute the principal parts and portions of my poultry feeder. The end members 1, are preferably boards provided with slanting upper ends adapted for the roof 8. Secured to these end members 1, near their lower ends is the bottom member 2 which is in step form as shown best in Fig. 3 of the drawings and this bottom extends past the front side 10 and is provided with a slanting portion on the extended side forming a trough 3, for the poultry to feed from. Secured near the upper ends of the members 1, are reenforcing sills 4, which extend past the back side of the feeder and on the extending ends are provided hinges 5, which hinges are secured to the side of the perpendicular support such as a building, post, or any perpendicular object thus providing means for pivotally supporting the feeder near its upper side. Secured to the lower sides of the end members 1, are sills 6, which extend some distance past the front side of the feeder and secured on the ends of these sills longitudinal with the feeder is a board 7 which forms a perch for the poultry to stand upon while feeding. Mounted at the back ends of these sills 6 are compression springs 11, interposed between the lower end of the feeder and the object 13 upon which the feeder is pivotally supported. Also secured to these sills 6 is a chain 12 by means of a staple 12$^a$ at one end and a hook 12$^b$ which is adapted to receive one of the rings of said chain and said hook is secured in the object 13 upon which the feeder is pivotally mounted. Extending across the front side of the feeder spaced some distance back from the slanting member 3$^a$ of the trough 3 and its lower edge spaced some distance above the floor, is the front side member 10 while the back 11 of the feeder is entirely enclosed from the floor to the roof.

Though I have shown and described a particular construction, combination and arrangement of parts and portions I do not wish to be limited to this particular contruction, combination, and arrangement but desire to include in the purview of my invention the construction, combination and arrangement substantially as set forth in the appended claims.

It is obvious that with this construction there is provided a poultry feeder which is pivotally mounted near its upper side to a perpendicular object in the poultry yard and provided with bumper springs interposed between the lower end of the feeder and the object upon which it is mounted so that when the poultry fly upon the perch 7 the feeder is caused to swing upon its pivotal mounting and the springs 11 cause it to swing and the step shaped bottom causes the food to move toward the trough, and prevents its backward movement by reason of the abutments formed by vertical portion of the steps that the chain 12 provides a means for regulating the swinging movement of the feeder, it being noted that the perch 7 may be positioned some distance from the ground so that the poultry will have to hop or fly to their perch for feeding.

Having thus described my invention what I claim as new and desire to secure by Letters Patent is:

1. A poultry feeder including a hopper with a step shaped bottom provided with a trough extending outwardly from the front side of said feeder adjacent to said floor and with a perch supported on the lower side of said feeder spaced a suitable distance from said trough, a support positioned back of said feeder upon which said feeder is pivotally mounted at its back upper side and springs interposed between said feeder and its support at its lower side.

2. A poultry feeder including, a hopper with a step shaped bottom provided with a trough extending outwardly from the front side of said feeder adjacent to said floor, a perch supported on the lower side of said hopper and spaced some distance from said trough, a support positioned back of said feeder upon which said feeder is pivotally mounted at its back upper side and springs interposed between said feeder and its support at its lower side, and means for regulating the movement of said feeder caused by the action of said springs.

In testimony whereof, I have hereunto set my hand at Kansas City, Kansas.

JOHN DIERKS.